United States Patent [19]
Linhardt et al.

[11] Patent Number: 5,873,260
[45] Date of Patent: Feb. 23, 1999

[54] REFRIGERATION APPARATUS AND METHOD

[76] Inventors: Hans D. Linhardt, 1221 West Coast Hwy., St. 204; Joseph Rosener, Jr., 125 Via Venezia, both of Newport Beach, Calif. 92663

[21] Appl. No.: 832,478

[22] Filed: Apr. 2, 1997

[51] Int. Cl.⁶ .................................................. F25B 33/00
[52] U.S. Cl. ................................................ 62/497; 62/101
[58] Field of Search .............................. 62/101, 476, 497

[56] References Cited

U.S. PATENT DOCUMENTS

| | | | |
|---|---|---|---|
| 4,152,904 | 5/1979 | Hester ........................................ | 62/476 |
| 4,264,338 | 4/1981 | Null . | |
| 4,420,946 | 12/1983 | Rojey et al. ............................... | 62/101 |
| 4,683,039 | 7/1987 | Twardowski et al. . | |
| 4,719,016 | 1/1988 | Sturkebaum et al. . | |
| 4,763,488 | 8/1988 | Johnston ................................... | 62/497 |
| 4,806,245 | 2/1989 | Boddeker . | |
| 4,962,270 | 10/1990 | Feimer et al. . | |
| 5,127,234 | 7/1992 | Woods ....................................... | 62/101 |
| 5,256,296 | 10/1993 | Baker et al. ............................. | 210/640 |
| 5,464,540 | 11/1995 | Friesen et al. . | |

Primary Examiner—William Doerrler
Attorney, Agent, or Firm—Harold L. Jackson

[57] ABSTRACT

A refrigeration cycle combines a concentrated absorbent liquid and a refrigerant in its vapor phase at low pressure in an absorber which provides, as an output, a liquid-rich refrigerant in solution with the absorbent liquid. The pressure of the absorbent/refrigerant solution is increased and the pressurized solution is supplied to a pervaporation membrane separator which provides as one output stream a vapor-rich refrigerant and as another output stream a concentrated liquid absorbent. The liquid-rich refrigerant output stream is condensed and subsequently expanded to a low pressure into an evaporator where it evaporates extracting heat from the spaced to be cooled. The concentrated liquid absorbent output stream from the separator is reduced in pressure and recombined in the absorber with the low pressure refrigerant vapor exiting the evaporator.

20 Claims, 3 Drawing Sheets

REFRIGERATION APPARATUS AND METHOD

FIELD OF THE INVENTION

The present invention relates to a refrigeration cycle for extracting heat from a fluid such as air at a low temperature, e.g., below 32° and preferably −25° F. or lower and more particularly to such a cycle which utilizes a refrigerant, an absorbent liquid and a membrane for transforming a low pressure refrigerant vapor into a higher pressure refrigerant/absorbent liquid for circulation back to the evaporator.

BACKGROUND OF THE INVENTION

Absorption-type refrigeration systems have been used for many years in the residential and commercial air conditioning and refrigeration markets. Compressor-type refrigeration systems have been used even more extensively in these markets for the same purposes.

In prior art absorption-type systems low-pressure refrigerant in its vapor state is absorbed by an absorbent liquid in an absorber, the absorber being cooled by water or air. The resulting refrigerant/absorbent solution is pumped to a higher pressure and supplied to a separator unit which utilizes heat (high temperature boils off the refrigerant) or very high pressure (osmotic membrane passes only the refrigerant) to separate the refrigerant from the absorbent. The separated refrigerant is then condensed, expanded to a low pressure (resulting in a low temperature) and delivered to an evaporator which extracts heat from the space being refrigerated.

Conventional ammonia absorption refrigeration systems utilizing ammonia, for example, as a refrigerant, and water as the absorbent liquid, and heat for the separation process, are capable of achieving low temperatures less than 32° F. and even down to −25° F. or lower. However, the ratio of refrigeration provided to the energy required by such a cycle, called the coefficient of performance ("COP"), is typically significantly less than 0.50.

Osmotic-membrane-absorption refrigeration cycles are also capable of reaching low temperatures and may have a COP higher than conventional ammonia/water heat-separation systems, but require very high pressures, of the order of 2,000 psia or more to force the refrigerant through the pores of the osmotic membrane. Such high pressure must be handled with considerable care and even then may create a potentially hazardous environment.

Conventional compressor-type systems rely on electricity as the power source. Although this type system is more efficient than heat-separation-absorption-type systems, i.e., providing a COP of around 4, the electricity to run such systems is approximately ten times more costly than the gas for heat-separation absorption type system. The cost savings of gas vs. electricity is not present in an osmotic-membrane-separation system when the high pressure pump is driven by an electric motor. In addition, compressor-type pumps, the refrigerants, for compression-type systems, may be very destructive of the ozone layer.

There is a need in the refrigeration field for an energy efficient system that does not require high working pressures or utilize a working fluid that is destructive of the ozone layer.

SUMMARY OF THE INVENTION

A heat pump cycle for providing low refrigeration temperatures in accordance with the present invention expands a liquid-rich refrigerant (permeate), such as ammonia, in an evaporator where it is evaporated at low temperature and pressure with heat added, i.e., removed from the space to be cooled, to provide a substantially vaporized low pressure refrigerant. The refrigerant in it's vapor phase is combined in an absorber with a concentrated absorbent liquid (retentate) such as water while extracting heat to provide a liquid-rich refrigerant in solution with the absorbent ("refrigerant/absorbent solution"). The solution, after the pressure thereof has been increased, is supplied to a pervaporation membrane separator which provides as one output a vapor-rich refrigerant and as another output the concentrated absorbent liquid.

The refrigerant vapor is then condensed, reduced in pressure and returned to the evaporator. At the same time the concentrated absorbent liquid from the separator member is reduced in pressure and returned to the absorber to complete the cycle.

In order to increase the efficiency of the cycle heat may be exchanged between the concentrated absorbent liquid output from the membrane separator and the pressurized absorbent/refrigerant solution prior to it's entry into the separator. In addition, the vapor-rich refrigerant output from the separator may be passed through an additional membrane separator to increase the purity of the vapor refrigerant and additional heat exchange may be provided between the various liquid and vapor phases of the constituents to further increase the temperature of the refrigerant vapor in the separator(s) and/or increase the pressure differential across the separator (s) to enhance the COP of the cycle.

The organization and operation of the invention may be best understood by reference to the following description taken in conjunction with the accompanying drawings in which like components are identified by the same reference numerals.

DESCRIPTION OF THE PREFERRED EMBODIMENT

Figure 1:
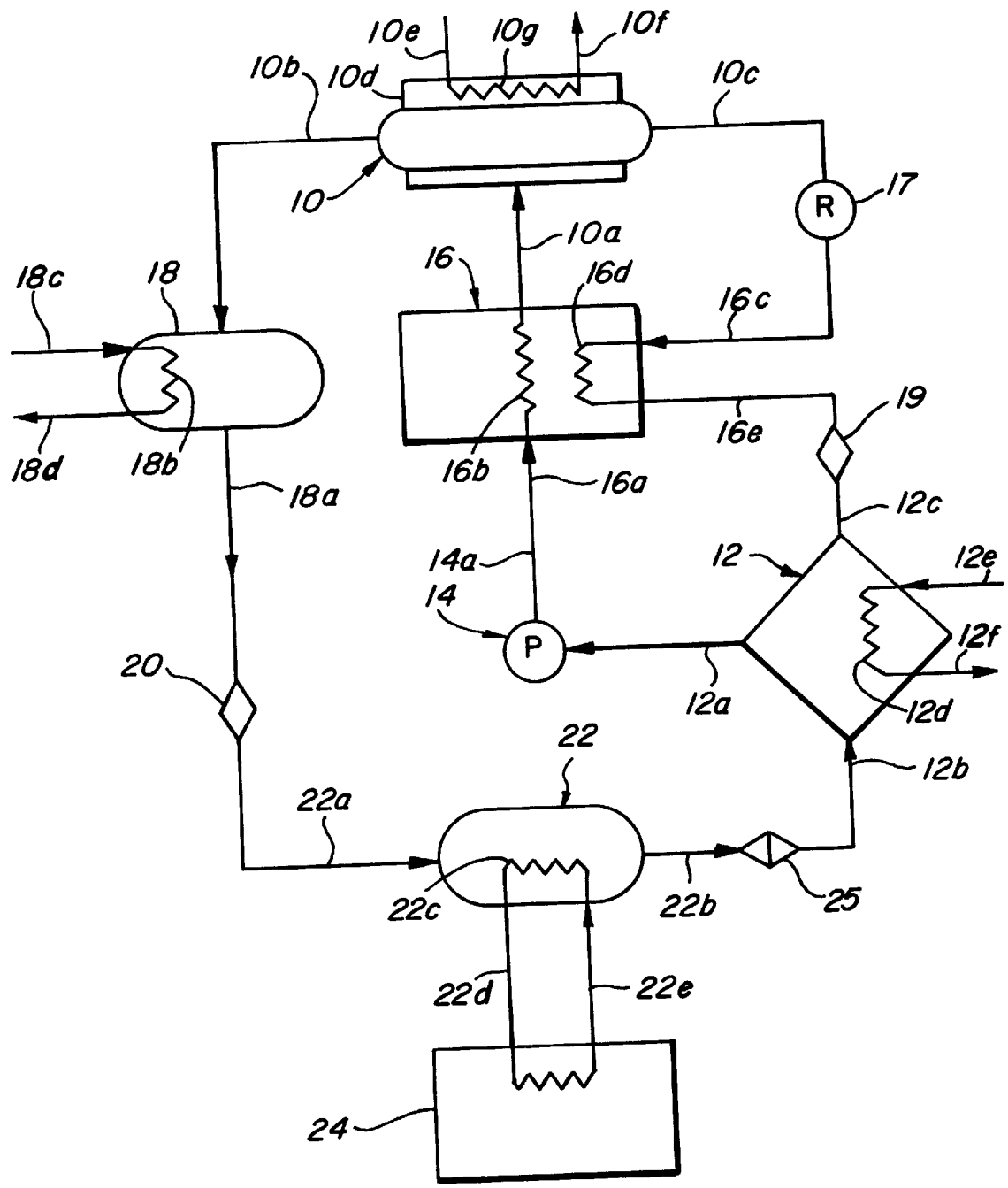
FIG. 1 is a schematic illustration of a simplified refrigeration cycle in accordance with the present invention.

Referring now to the drawings, and particularly to FIG. 1, an input line 10a of a pervaporation membrane separator unit 10 is connected to the output line 12a of an absorber 12 via pump 14 and a retentate heat exchanger 16. It should be noted that the heat exchanger 16 is not essential to the operation of a simplified system in accordance with our invention (which increases the COP).

The absorber, in combining the refrigerant vapor, supplied via input line 12b, with the liquid absorbent supplied via input line 12c, generates heat which is removed by means of an internal heat exchange coil 12d. Heat exchange lines 12e and 12f are provided to conduct the heat exchange fluid through the coil 12d.

The output of the absorber on line 12a is a dilute solution of liquid-rich refrigerant, e.g., ammonia, and the absorbent liquid, e.g., water. The pump 14 increases the pressure of this refrigerant/absorbent solution from, say, about 10–15 psia (at the output of the absorber) to, say, about 200 to 350 psia at the input line 16a to the internal coil 16b of heat exchanger 16. The retentate heat exchanger 16 increases the temperature of the refrigerant/absorbent solution as a result of the removal of heat from the concentrated absorbent liquid being returned from the separator output line 10c to the input 12c of the absorber, via a pressure regulator 17, line 16c, internal heat exchanger coil 16d, line 16e, and a restrictor element 19. The pressure regulator 17 maintains the pressure of the liquid absorbent in the separator while lowering the pressure of the absorbent entering the heat exchanger 16.

The pervaporation membrane separator 10 provides two output streams in output lines 10b and 10c. The output stream in line 10b constitutes the permeate, i.e., a vapor-rich refrigerant (substantially in the vapor phase) and the output stream in line 10c constitutes a concentrated liquid absorbent (i.e., the retentate). An internal heat exchanger 10d, formed integrally with the separator 10, adds heat from an external source (not shown), via lines 10e, 10f and coil 10g, to increase the temperature of the fluids within the separator to say about 250° to 400° F. to enhance the efficiency of the separator. The vapor-rich refrigerant stream in output line 10b is condensed in a condenser 18. The condenser 18 includes an internal heat exchange coil 18b which receives cooling fluid such as water from a source such as a cooling tower (not shown) via lines 18c and 18d. The liquified refrigerant output stream in line 18a from the condenser passes through an expansion or restrictor element 20, such as a Joule Thompson or JT valve, to lower the pressure (and temperature) of the fluid. Next, the refrigerant stream is passed through an evaporate 22, via input line 22a, at a low temperature, e.g., less than 32° F. and absorbs heat supplied by a suitable heat exchange fluid conducted through an internal coil 22c via lines 22d and 22e from a heat exchanger 24. The heat exchanger 24 is in fluid communication with the space to be cooled such as a refrigerated room etc. The heat transfer process in the evaporator 22 vaporizes all or at least a substantial portion of the refrigerant. The low pressure vaporized refrigerant flows from the output 22b of the evaporator to the absorber 12.

The concentrated liquid absorbent in line 10c is also supplied to the absorber 12 via pressure regulator 17, heat exchanger 16, as discussed earlier, and restrictor element 19. The pressure regulator 17 and the restrictor 19 equalize the pressure of the absorbent in line 12c to the fluid pressure within the absorber. In the absorber the vapor refrigerant is combined with the concentrated liquid absorbent to form the dilute solution of the liquid-rich refrigerant and the absorbent liquid to complete the cycle.

It should be noted that the concentrated liquid absorbent output from the separator will generally comprise absorbent as well as some refrigerant. By the same token, the separated portion of the refrigerant will generally include some absorbent.

Figure 2:
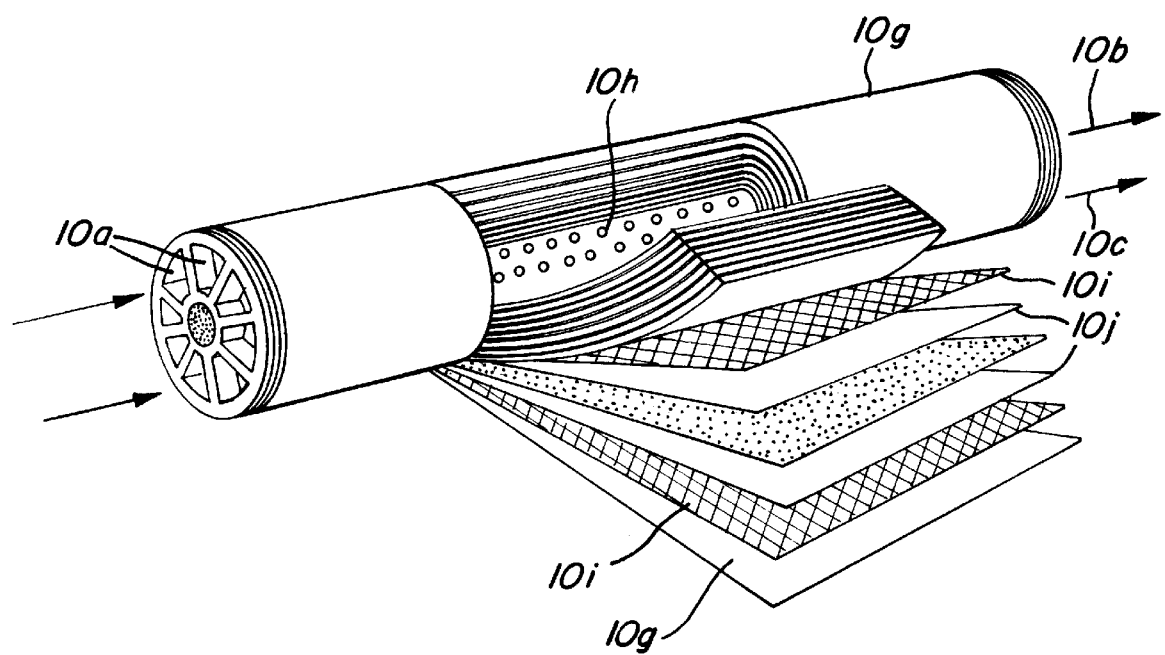
FIG. 2 is a perspective view of a pervaporation membrane separator which is suitable for use in the invention.

Absorbers and pervaporation membranes suitable for use in the new cycle are well known in the art. With respect to the absorbers, see, for example, chapter 40 of the 1994 Ashrai Handbook on Refrigeration Systems and Applications, IP Edition, published by the American Society of Heating, Refrigeration, and Air Conditioning Engineers, Inc. Desalination Systems, Inc. of Vista, Calif. supplies pervaporation membrane units (model Nos. De Sal 3 and 5) suitable for use in the invention and particularly for separating ammonia and water. One such membrane separator unit, with an integrally formed heat exchanger added thereto, is shown in FIG. 2. The refrigerant/absorbent solution is supplied to the annular inlet 10a. The refrigerant, along with a minor portion of absorbent, dissolves into the membrane and passes into an open center tube which is in fluid communication with the refrigerant outlet line 10b. The absorbent, except for a small portion which follows the refrigerant, remains on the outside of the membrane and flows through the outlet line 10c. An example of a pervaporation membrane unit, without a heat exchanger which would typically surround the unit, is illustrated in FIG. 2. The unit includes an outer impermeable shell 10g, an annular inlet 10a and a central hollow core 10h, into which the refrigerant or permeate flows. The core 10g is closed adjacent the inlet 10a and forms the refrigerant/permeate outlet at the end opposite the inlet. The annular outlet 10c mirrors the annular inlet 10a. Concentric layers of feed channel spacers 10i, membrane material 10j and permeate collection material 10k surround the perforated inner core 10h.

It is to be noted that a pervaporation membrane operates in a totally different fashion from the prior art membrane separation processes used in refrigeration and heat pump systems. Such prior art membrane systems rely on osmotic pressure to force the refrigerant through the membrane thereby separating the refrigerant from other constituents. For the ammonia-water pair, this conventionally requires pressures of the order of magnitude of 2,000 to 4,000 PSI and higher. Osmotic membranes are porous which allows the ammonia to pass through the membrane. Pervaporation membranes are not porous, but pass constituents through the membrane by dissolving the selected material into the membrane. This allows a much lower driving force, significantly less than 400 PSI, to act as the driver. In the case of an ammonia-water mixture, the pervaporation membrane, selectively passes ammonia and water vapor and rejects liquid water.

Figure 3:
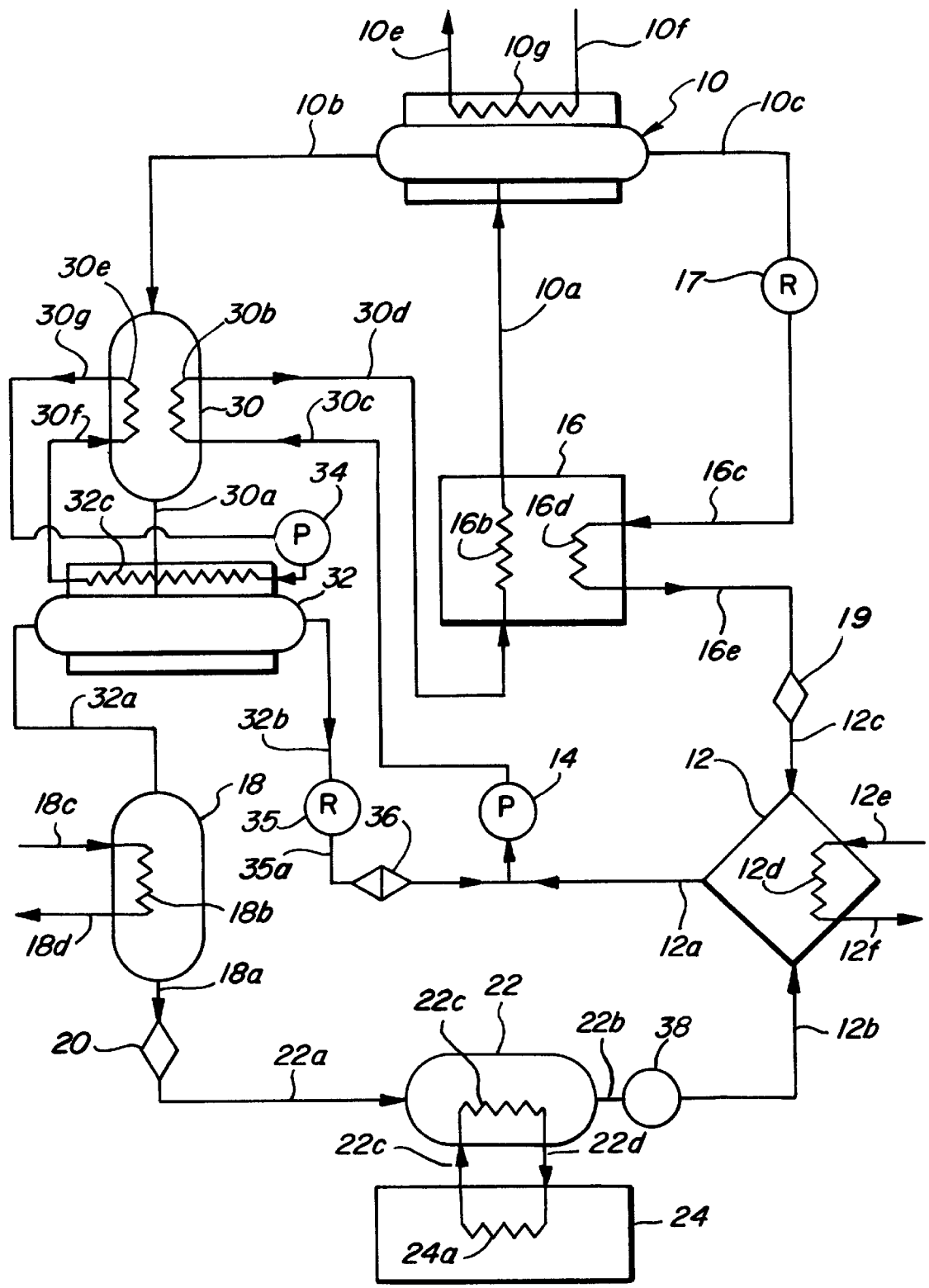
FIG. 3 is a schematic illustration of a more efficient refrigeration cycle in accordance with the present invention.

A refrigeration cycle for applications requiring very low temperatures of the order of −20° to −45° F. or lower is illustrated in FIG. 3. A heat exchanger 30 and a second separator 32 are connected in series between the first separator 10 and the condenser 18 to increase the purity of the refrigerant entering the evaporator 22. The heat exchanger 30 extracts heat from the refrigerant-rich vapor output on line 10b from the first separator 10 to reduce the temperature of the output stream and provide the pressure differential across the pervaporation membrane necessary to induce the refrigerant to pass therethrough. The refrigerant output of the heat exchanger on line 30a is in its liquid phase. A heat exchanger coil 30b, internal to the heat exchanger 30, is connected in series between the output line 14a of the pump 14 and the inlet of the heat exchanger 16 via lines 30c and 30d so that a portion of the heat extracted from the vapor refrigerant is added to the refrigerant/absorbent solution being fed to the heat exchanger 16 to thereby increase the temperature of the liquid entering the separator 10.

Another heat exchange coil 30e, internal to the heat exchanger 30, supplies another portion of the heat extracted from the refrigerant to the second separator 32 via a closed circuit fluid circulating system driven by a pump 34. The input and output lines for coil 30c, designated 30f and 30g, respectively, are in fluid communication with an internal heat exchange coil 32c in the second separator 32.

The second separator 32 provides two output streams, i.e., a refrigerant-rich vapor stream of increased purity on line 32a and an absorbent-rich liquid on line 32b. The vapor stream in output line 32a is fed to the condenser 18 and the absorbent-rich liquid in output line 32b is fed back to the input (line 12a) of the pump 14 via a pressure regulator 35, line 35a and restrictor 36 to be combined with the refrigerant/absorbent solution exiting the absorber 12. The pressure regulator 35 and restrictor 36 control the pressure of the absorbent-rich liquid so that it is compatible with the pressure of the output stream from the absorber.

To improve the efficiency and thereby increase the COP of the cycle, a low temperature compressor 38 may be connected between the outlet 22b of the evaporator and the input line 12b to the absorber 12. The compressor increases the pressure of the refrigerant vapor entering the absorber.

The following chart illustrates typical parameters such as pressures, temperatures, and liquid vs. vapor phases of the fluids etc. in the various lines or components (i.e., separators) in FIG. 3.

TWO SERIES SEPARATOR STAGES AMMONIA IN SATURATED WATER LOWEST TEMPERATURE −45° F.

COP 0.6332

| Fluid lines or components | Pres. PSIA | Temp. °F. | Fluid Condt. | Composition Lb.NH$_3$ Mix /LB.Mix |
|---|---|---|---|---|
| First Stage Separator 10 | | | | |
| 10a | 270 | 255 | liquid | 0.320 |
| 10e | | 385 | H.T.fluid | 0.000 |
| 10f | | 265 | H.T.fluid | 0.000 |
| 10b | 240 | 254 | vapor | 0.902 |
| Refrigerant Flow Heat Exchanger 30 | | | | |
| 30a | 238 | 115 | liquid | 0.902 |
| 30g | | 210 | H.T.fluid | 0.000 |
| 30f | | 120 | H.T.fluid | 0.000 |
| 30c | 290 | 105 | liquid | 0.3200 |
| 30d | 285 | 202 | liquid | 0.3200 |
| Second Stage Separator 32 | | | | |
| 32a | 228 | 110 | vapor | 0.9995 |
| 32b | 236 | 115 | liquid | 0.0046 |
| 18c | | 85 | H.T.fluid | 0.000 |
| 18d | | 95 | H.T.fluid | 0.000 |
| 18a | 212 | 100 | liquid | 0.9995 |
| Evaporator 22 | | | | |
| 22a | 9 | −45 | liquid | 0.9995 |
| 22c | | −35 | H.T.fluid | 0.000 |
| 22d | | −40 | H.T.fluid | 0.000 |
| 22b | 8.9 | −45 | vapor | 0.9995 |
| Compressor 36 12b | 27 | 130 | vapor | 0.9995 |
| Retentate Heat Exchanger 16 | | | | |
| 10a | 280 | 255 | liquid | 0.3200 |
| 16c | 266 | 375 | liquid | 0.0562 |
| 16e | 256 | 201 | liquid | 0.0562 |
| Absorber 12 | | | | |
| 12c | 27 | 201 | liquid | 0.0562 |
| 12e | 15 | 85 | H.T.fluid | 0.000 |
| 12d | 5 | 95 | H.T.fluid | 0.000 |
| 12a | 27 | 105 | liquid | 0.3200 |

There has been described a novel and simple refrigeration cycle, method and apparatus for achieving low temperatures which provides a relative high COP while preferably using working fluids that are much more compatible with the atmosphere than the refrigerants used in the conventional vapor-compression systems. While the invention has been described with respect to a preferred embodiment it will be apparent to those skilled in the art that the invention is susceptible to additional embodiments and modifications without departing from the spirit and scope of the invention as defined in the appended claims.

What is claimed is:

1. A refrigeration cycle using as a working fluid a refrigerant and a concentrated liquid absorbent comprising:
    a) combining the concentrated absorbent liquid and the refrigerant substantially in its vapor phase at low pressure in an absorber while extracting heat to provide a liquid-rich refrigerant in solution with the absorbent liquid;
    b) increasing the pressure of the absorbent/refrigerant solution;
    c) separating the refrigerant from the absorbent liquid in a pervaporation selective membrane separator which provides as one output a vapor-rich refrigerant and as another output a concentrated absorbent liquid;
    d) condensing the vapor output of the membrane separator to provide a liquid-rich refrigerant in a first condenser;
    e) expanding the liquid-rich refrigerant from a high to a low pressure into an evaporator where it is evaporated at low temperature and pressure with heat added to provide a substantially vaporized low pressure refrigerant;
    f) reducing the pressure of the concentrated absorbent liquid from the membrane separator to substantially equalize the pressure between the absorbent liquid and the low pressure substantially vaporized refrigerant; and
    g) returning the low pressure concentrated absorbent liquid and the substantially vaporized refrigerant to the absorber in repetition of the cycle.

2. The refrigeration cycle of claim 1 wherein the refrigerant is ammonia and the absorbent is water.

3. The refrigeration cycle of claim 2 wherein the expansion operation of the refrigerant from the first to the lower pressure is provided by an expansion valve.

4. The refrigeration cycle of claim 3 wherein the expansion operation of the refrigerant from the first to the lower pressure is provided by an expansion turbine.

5. The refrigeration cycle of claim 3 wherein the pressure of the substantially vaporized refrigerant input to the absorber is less than 50 psia.

6. The refrigeration cycle of claim 1 further including exchanging heat between the concentrated absorbent liquid output from the membrane separator and the pressurized absorbent/refrigerant solution.

7. The refrigeration cycle of claim 6 further including increasing the pressure of the vaporized refrigerant vapor prior to its return to the absorber.

8. The refrigeration cycle of claim 7 further including:
    removing heat from the vapor-rich refrigerant exiting said pervaporation membrane separator (hereinafter the "first separator"), separating additional refrigerant from the absorbent in a second pervaporation membrane separator having as one output an enriched vapor refrigerant and as another output concentrated absorbent liquid;
    supplying the vapor output of the second membrane separator to the condenser and then to the evaporator; and
    recombining the concentrated absorbent liquid from the second membrane separator with the absorbent/refrigerant solution entering the first membrane separator.

9. The refrigeration cycle of claim 8 further including exchanging heat between the vapor-rich refrigerant output stream from the first separator and the pressurized absorbent/refrigerant solution.

10. The refrigeration cycle of claim 5 wherein the pressure of the absorbent/refrigerant solution entering the membrane separator is within the range of about 250 to 400 psia.

11. A process for cooling or heating comprising:
   a) combining a refrigerant substantially in its vaporized form at a low pressure with a concentrated absorbing liquid while extracting heat to provide a resulting dilute solution of liquid-rich refrigerant and absorbing liquid;
   b) pumping the absorbent/refrigerant solution to a higher pressure;
   c) passing the pressurized absorbent/refrigerant solution through a pervaporation membrane separator to separate the solution into two streams, one stream comprising primarily a vapor-rich refrigerant and the other stream comprising a concentrated absorbent liquid;
   d) substantially condensing the vapor output from the membrane separator to provide a liquid-rich refrigerant;
   e) passing the liquid-rich refrigerant stream through an expansion element to reduce the pressure and temperature thereof;
   f) passing the liquid-rich refrigerant through an evaporator while adding heat to allow a substantial portion of the refrigerant to vaporize;
   g) adjusting the pressure of the vaporized refrigerant from the evaporator and the concentrated liquid absorbent from the membrane to substantially the same pressure; and
   h) repeating steps a–g above.

12. The process of claim 11 further including the steps of:
   (i) passing the liquid-rich refrigerant from step d through an additional pervaporation membrane separator to separate the liquid into an enriched vapor-rich refrigerant as one stream and an additional concentrated absorbent liquid as another stream;
   (j) condensing the enriched vapor-rich refrigerant stream;
   (k) continuing step e with the enriched liquid refrigerant stream; and
   (l) recombining the additional concentrated absorbent liquid with the absorbent/refrigerant solution prior to step b.

13. The process of claim 12 further including the step of:
   (m) compressing the vapor refrigerant output stream from the evaporator.

14. The process of claim 13 further including the step of:
   (n) exchanging heat between the output concentrated absorbent liquid stream from the membrane separator with the pressurized absorbent/refrigerant solution.

15. The process of claim 14 further including the step of:
   (o) exchanging heat between the pressurized absorbent/refrigerant solution and vapor-rich refrigerant from the first pervaporation membrane separator.

16. In a refrigeration system for extracting energy in the form of heat from a desired space by utilizing as a working fluid a refrigerant in solution with an absorbent, the combination comprising:
   a first pervaporation membrane separator for separating an absorbent/refrigerant solution into two streams, one stream comprising primarily refrigerant in its vapor state and the other stream comprising a concentrated liquid absorbent/refrigerant solution;
   a condenser in fluid communication with the membrane assembly for condensing the refrigerant vapor stream into substantially a liquid;
   a pressure reducer in fluid communication with the condenser for reducing the temperature of the liquid refrigerant stream output of the condenser by expanding it to a lower temperature;
   an evaporator in fluid communication with the pressure reducer and said space to be cooled for transferring energy from said space to substantially evaporate the refrigerant;
   an absorber for recombining the vaporized refrigerant from the evaporator and the concentrated absorbent/refrigerant solution from the membrane separator;
   pressure regulating means connected between the absorber, the membrane separator and the evaporator for substantially equalizing the pressures of the concentrated absorbent/refrigerant solution and the vapor refrigerant entering the absorber; and
   a pump in fluid communication with the absorber and the membrane separator for supplying the recombined refrigerant and absorbent from the absorber to the membrane separator under pressure.

17. The system of claim 16 further including a second pervaporation membrane connected in series between the refrigerant output of the first membrane separator and the condenser.

18. The system of claim 17 further including a compressor connector in series between the evaporator and the absorber.

19. A refrigeration cycle using as a working fluid a solution of refrigerant and an absorbent dissolvable in the refrigerant comprising:
   a) separating a portion of liquid-rich refrigerant from an absorbent/refrigerant solution in a first pervaporation membrane separator at a first pressure, the membrane separator assembly providing as one output stream a vapor comprising primarily the refrigerant and as another output stream a liquid comprising primarily the absorbent solution;
   b) condensing the vapor stream from the separator into a liquid-rich refrigerant;
   c) expanding the liquid-rich refrigerant stream from the condenser to a low pressure into an evaporator where it is evaporated at low temperature with heat added to provide a substantially low pressure vapor;
   d) adjusting the pressure of the vaporized refrigerant to substantially a second pressure;
   e) adjusting the pressure of the concentrated absorbent/refrigerant solution from the separator to substantially said second pressure;
   f) combining the concentrated absorbent/refrigerant solution and the substantially vaporized refrigerant in an absorber at said second pressure while extracting heat to provide a liquid-rich refrigerant in solution with the absorbent;
   f) increasing the pressure of the solution to the first pressure; and
   g) returning the pressurized solution to the separator.

20. The cycle of claim 19 further including a second membrane for separating additional absorbent from the refrigerant-rich vapor exiting the first membrane separator.

* * * * *